US010989515B2

(12) United States Patent
Tiemann et al.

(10) Patent No.: US 10,989,515 B2
(45) Date of Patent: Apr. 27, 2021

(54) INDUCTIVE POSITION MEASURING DEVICE

(71) Applicant: DR. JOHANNES HEIDENHAIN GmbH, Traunreut (DE)

(72) Inventors: Marc Oliver Tiemann, Waging am See (DE); Alexander Frank, Traunstein (DE); Martin Heumann, Traunstein (DE); Daniel Auer, Traunstein (DE); Oliver Sell, Traunreut (DE)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 185 days.

(21) Appl. No.: 16/200,162

(22) Filed: Nov. 26, 2018

(65) Prior Publication Data

US 2019/0170494 A1 Jun. 6, 2019

(30) Foreign Application Priority Data

Dec. 6, 2017 (DE) .......................... 102017222063.5

(51) Int. Cl.
*G01B 7/00* (2006.01)
*G01D 5/20* (2006.01)
(Continued)

(52) U.S. Cl.
CPC ............. *G01B 7/003* (2013.01); *G01B 7/14* (2013.01); *G01D 5/2046* (2013.01); *G02B 26/10* (2013.01)

(58) Field of Classification Search
CPC ...... G01D 5/3473; G01D 5/20; G01D 5/2013; G01D 5/2452; G01D 5/2451; G01B 7/30; G01R 31/382
See application file for complete search history.

(56) References Cited

U.S. PATENT DOCUMENTS

2006/0001518 A1* 1/2006 Hayashi ............... G01D 5/2046
336/200
2014/0167746 A1* 6/2014 Tiemann ............... G01D 5/2053
324/207.17
2015/0109001 A1 4/2015 Singh et al.

FOREIGN PATENT DOCUMENTS

DE 1295204 B 5/1969
DE 102012223037 A1 6/2014
(Continued)

OTHER PUBLICATIONS

European Search Report issued in Application No. EP 18193629, dated Mar. 21, 2019.

*Primary Examiner* — Alesa Allgood
(74) *Attorney, Agent, or Firm* — Carter DeLuca & Farrell LLP

(57) ABSTRACT

An inductive position-measuring device includes a scanning element and a graduation element, rotatable about an axis relative to the scanning element. The scanning element has exciter lead(s), a first receiver track, including receiver line(s), extending according to a first periodic pattern having a first period along a first direction, and a second receiver track, including receiver line(s). The graduation element includes a graduation track, extending in the circumferential direction and including a graduation period. An electromagnetic field generated by the exciter lead(s) with the aid of the graduation track is able to be modulated, so that an angular position is detectable with the aid of the receiver line of the first receiver track, and a position of the graduation element in the first direction relative to the scanning element is detectable with the aid of the receiver line of the second receiver track.

20 Claims, 4 Drawing Sheets

(51) Int. Cl.
*G01B 7/14* (2006.01)
*G02B 26/10* (2006.01)

(56) References Cited

FOREIGN PATENT DOCUMENTS

GB 1006691 A 10/1965
WO WO 2007/137693 A2 12/2007

* cited by examiner

INDUCTIVE POSITION MEASURING DEVICE

CROSS-REFERENCE TO RELATED APPLICATIONS

The present application claims priority to Application No. 10 2017 222 063.5, filed in the Federal Republic of Germany on Dec. 6, 2017, which is expressly incorporated herein in its entirety by reference thereto.

FIELD OF THE INVENTION

The present invention relates to an inductive position-measuring device for determining relative positions.

BACKGROUND INFORMATION

Inductive position-measuring devices, for example, are used as angle encoders for determining the angular position of two machine components that are rotatable relative to each other. In the case of inductive position-measuring devices, field coils and receiver coils, e.g., in the form of circuit traces, are often applied to a shared, usually multi-layer circuit board, which is firmly connected to a stator of an angle encoder, for instance. Situated opposite this circuit board is a graduation element on which electrically conductive and non-conductive areas or webs and gaps are alternately applied at periodic intervals as a graduation structure, and which is connected to the rotor of the angle encoder in a torsionally fixed manner. If a temporally varying electrical excitation current is applied at the field coils, then signals that are a function of the angular position are generated in the field coils during the relative rotation between the rotor and stator. The signals are then further processed in an evaluation electronics.

Such inductive position-measuring devices are frequently employed as measuring devices for electrical drives, for the purpose of determining the relative movement or the relative position of corresponding machine components. In such a case, the generated position values are conveyed via a corresponding interface system to subsequent electronics for the control of the drives.

BACKGROUND INFORMATION

German Published Patent Application No. 10 2012 223 037 describes an angle encoder by which an axial displacement of the graduation element is able to be determined in conjunction with the measurement of the angular position.

SUMMARY

Example embodiments of the present invention provide an inductive position-measuring device that makes it possible to easily determine a relative angular position and also a position in a first direction which extends along the receiver tracks.

According to an example embodiment of the present invention, an inductive position-measuring device includes a scanning element and a graduation element, the graduation element being disposed so as to be rotatable about an axis in relation to the scanning element or to be movable in a rotary manner. The scanning element includes an exciter lead or multiple exciter leads. In addition, the scanning element includes a first receiver track having at least one receiver line, which extends along a first direction according to a first periodic pattern having a first period. More specifically, the first receiver track may have a plurality of receiver lines which extend according to a first periodic pattern having a first period along a first direction. Moreover, the scanning element has a second receiver track, which includes at least one receiver line. The graduation element includes a graduation track that extends in the circumferential direction in relation to the axis and has a graduation period tangentially along the circumferential direction. The position-measuring device is configured such that an electromagnetic field, which is generated with the aid of the graduation track by the at least one exciter lead, is able to be modulated, so that an angular position of the graduation element relative to the scanning element is detectable or measurable with the aid of the receiver line of the first receiver track. In addition, a position of the graduation element in the first direction relative to the scanning element is detectable or measurable with the aid of the receiver line of the second receiver track.

The second receiver track includes at least one receiver line, which may extend according to a second periodic pattern having a second period along the first direction. More specifically, the second receiver track may have a plurality of receiver lines that extend according to a second periodic pattern having a second period along the first direction.

Thus, a period is a geometrical length.

The first receiver track has at least one receiver line, which includes a plurality of windings that are lined up next to each other in the first direction. In addition, the scanning element has a second receiver track, which includes at least one receiver line that has at least one winding.

With the aid of the receiver line of the first receiver track, it is therefore possible to detect a rotary motion or an angular position about the axis, which, however, may be affected by error, for instance as the result of an eccentricity error of the graduation element or due to an imprecise placement of the graduation element in the first direction relative to the scanning element. With the aid of the receiver line of the second receiver track, a translation or a linear position in the first direction defined above is able to be detected. With knowledge of the measurement with the aid of the second receiver track, it is therefore possible to correct the angular position ascertained using the receiver line of the first receiver track, so that that the system accuracy with regard to the measurement of the angular position is effectively increased.

The scanning element and the graduation element are placed opposite each other and are separated from each other by an air gap that extends in a second direction. The second direction is particularly oriented at a right angle to the first direction and particularly also at a right angle to the axis about which the graduation element is rotatably disposed with respect to the scanning element.

The first receiver track or the second receiver track, or both receiver tracks, may have at least two receiver lines in each case, which may be disposed at a phase offset (e.g., at a phase offset of 90°) relative to each other.

The length of the first period may roughly correspond to the length of the graduation period. More specifically, the following may applies:

1.5>[first period:graduation period]>0.75 or 1.25>[first period:graduation period]>0.85 or 1.15>[first period:graduation period]>0.9.

The first receiver track may have at least one receiver line that extends along the first direction across a first length, the first length being at least three times greater than the first period (or three times as great as the first period). In particular, the first length may be at least four or six times greater than the first period.

The receiver line of the first receiver track may have at least two windings.

In particular, the receiver line of the first receiver track may have more windings than the receiver line of the second receiver track.

The receiver line of the second receiver track may be disposed according to a second periodic pattern having a second period, the second period being greater or longer than the first period. For example, the first and/or the second periodic pattern may have a sinusoidal characteristic. The second period may be at least two times greater, at least four times greater, and/or six times greater than the first period, for example.

The receiver line of the second receiver track may be disposed according to a second periodic pattern having a second period, and the graduation period of the second period may be greater than the period of the graduation track.

In relation to the axis, the first receiver track may be arranged at a radial offset relative to the second receiver track. More specifically, the first receiver track is situated at a smaller radial distance from the axis than the second receiver track.

The graduation track may be situated along a lateral surface of a cylindrical body and may have an extension in the circumferential direction. The graduation element therefore has a curved lateral surface on which the graduation track is situated.

The first receiver track or the second receiver track or both receiver tracks may be disposed on a curved plane, the radius of curvature of the curved plane differing from the radius of curvature of the curved lateral surface on which the graduation track is disposed. In particular, the first receiver track or the second receiver track or both receiver tracks may be situated on a flat plane.

The graduation track may include webs and gaps that are disposed in alternation along the first direction. Alternatively, the graduation track may be formed of a graduation structure that has electrically conductive and non-conductive areas that are situated in alternation along the first direction. The graduation structure may also encompass other ferromagnetic geometries. A graduation period is a geometrical length that is defined by the graduation structure. For instance, there are precisely one conductive and one non-conductive area or precisely one web and one gap within a graduation period. When a graduation period is scanned, a signal period is able to be generated with the aid of the scanning element.

The graduation element may have a circular outer contour having a diameter. The second receiver track furthermore has at least one receiver line that extends across a specific length along the first direction, the length being greater than one-half of the diameter. For example, the length is at least 0.75 times greater than the diameter. In addition, the first receiver track may have at least one receiver line which extends across a first length along the first direction, the first length being greater than the diameter. The first length may be greater than 1.5 times the diameter or greater than twice the diameter.

The graduation element may have a circular outer contour having a diameter, and the receiver line of the second receiver track may be disposed according to a second periodic pattern having a second period. The second period is greater than the diameter.

The position-measuring device may provide for a detection of the relative position of the graduation element in the first lateral direction, independently of the angular position of the graduation element.

A first signal having a first amplitude amount may be generated with the aid of the receiver line of the first receiver track, and a second signal having a second amplitude amount may be generated with the aid of the receiver line of the second receiver track. The position-measuring device is configured such that a distance of a second direction between the scanning element and the graduation element is able to be determined on the basis of the first amplitude amount and the second amplitude amount. For example, a quotient may be formed from the first amplitude amount and the second amplitude amount, which includes the information about the distance. Alternatively, it is also possible to form a difference from the first amplitude amount and the second amplitude amount for such a purpose.

Example embodiments of the present invention also include a position-measuring device whose scanning element has a plurality of first receiver tracks that are disposed at an offset in the axial direction, e.g., for the detection of absolute angular positions according to the Nonius principle, in which case the graduation element also has a plurality of graduation tracks that are disposed at an offset in the axial direction. Such a position-measuring device may also have a plurality of second receiver tracks disposed at an offset in the axial direction. Suitable processing of the detected signals or their amplitude amounts additionally makes it possible to also determine the tilting of the axis relative to the scanning element in such a system.

Further features and aspects of example embodiments of the present invention are described in more detail below with reference to the appended Figures.

DETAILED DESCRIPTION

Figure 1:
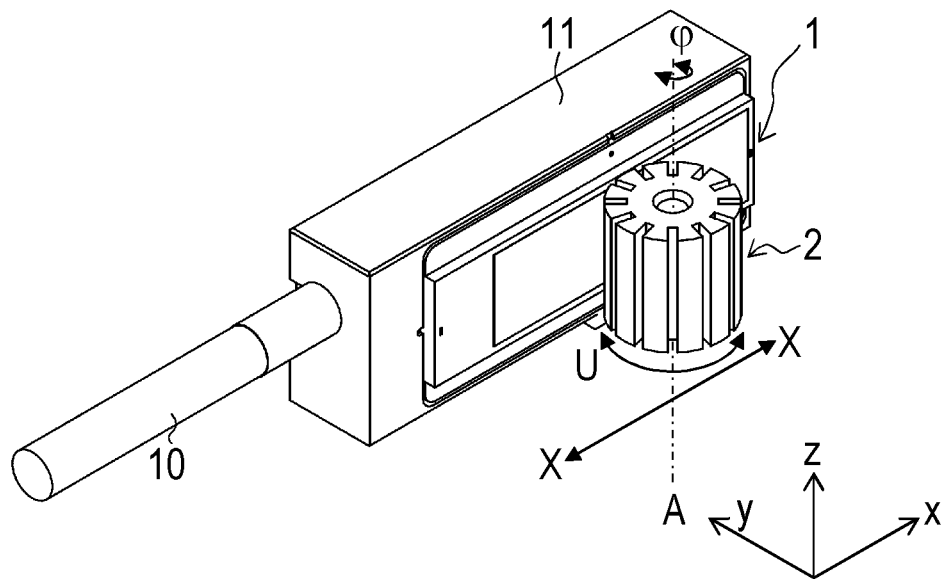
FIG. 1 is a perspective view of a position-measuring device for determining a relative angular position.

Example embodiments of the present invention are described on the basis of a position-measuring device intended for the detection of an angular position $\varphi$ between a scanning element 1 and a graduation element 2 or a scale that is able to be rotated about an axis A (see FIG. 1).

In order to achieve a proper operative state, graduation element 2 is positioned along a first direction X relative to scanning element 1 so that scanning element 1 and graduation element 2 are situated opposite each other and are separated by an air gap that extends in a second direction Y.

Figure 2:
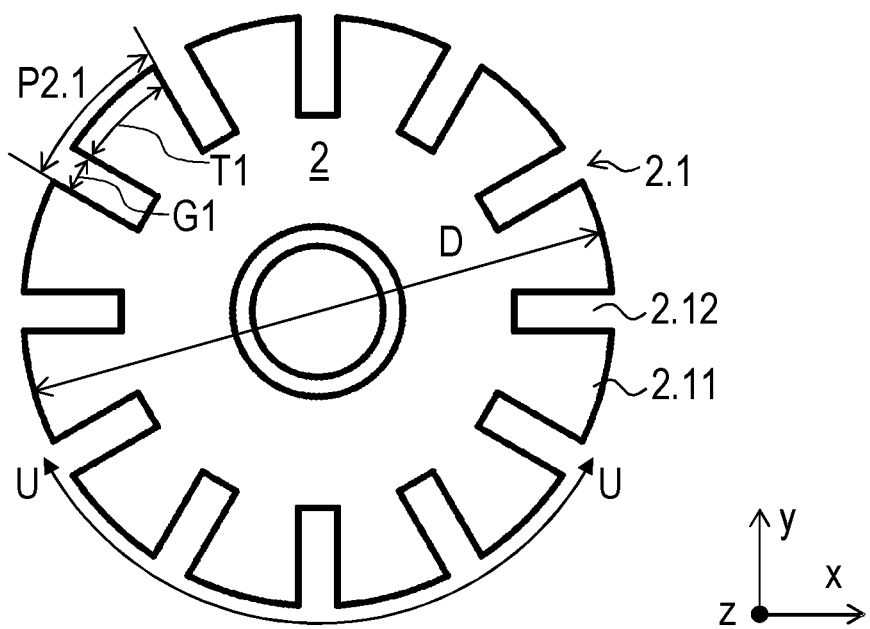
FIG. 2 is a plan view of a graduation element.

Graduation element 2 is arranged as a substantially cylindrical body having an axis A, on whose lateral surface a graduation track 2.1 is situated (see also FIG. 2). Graduation track 2.1 extends in circumferential direction U and has a graduation period P2.1 along circumferential direction U. In the illustrated exemplary embodiment, graduation track 2.1 includes webs 2.11 and interposed gaps 2.12, first graduation track 2.1 having twelve such webs 2.11 and gaps 2.12 (n=12) in each case. Graduation track 2.1 thus is made up of a periodic sequence of alternatingly disposed webs 2.11 and gaps 2.12. Graduation period P2.1 of graduation track 2.1 results from the sum of length T1 of one of webs 2.11 and length G1 of one of gaps 2.12, lengths T1, G1 extending in circumferential direction U. Lengths T1 are of equal size for all webs 2.11 and also lengths G1 of gaps 2.12. In the illustrated exemplary embodiment, diameter D of graduation element 2 amounts to nine millimeters. Graduation period P2.1 may thus be ascertained in the following manner:

$P2.1 = D \cdot \pi / n = 9 \text{ mm} \cdot \pi / 12 = 2.36 \text{ mm}$

Figure 3:
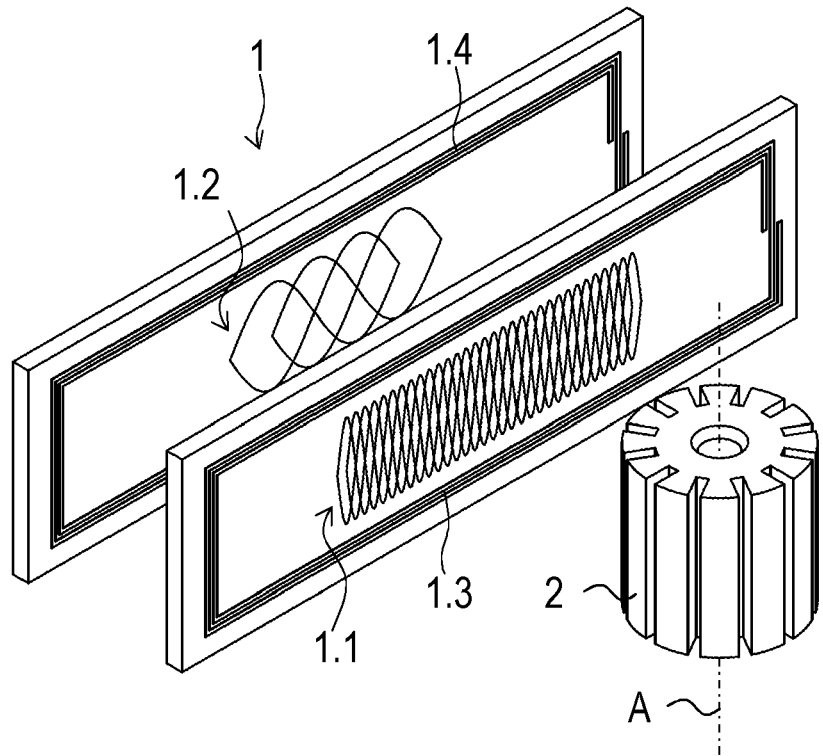
FIG. 3 is a perspective view of components of a scanning element as well as the graduation element.

FIG. 3 schematically illustrates components of the position-measuring device. Scanning element 1 includes a planar, multi-layer circuit board on which a first receiver track 1.1 and an exciter lead 1.3 as well as a second receiver track 1.2 and an exciter lead 1.4 are disposed at different levels. For illustration purposes, the planes are shown separately in the view of FIG. 3. However, it should be understood that the two planes are located immediately adjacent to each other. The position-measuring device is configured such that first receiver track 1.1 is situated at a radial offset relative to second receiver track 1.2 in relation to axis A. First receiver track 1.1 is therefore located lies closer to axis A than second receiver track 1.2. Receiver tracks 1.1, 1.2 include two receiver lines 1.11, 1.12; 1.21, 1.22 in each case. In the illustrated exemplary embodiment, receiver lines 1.11, 1.12; 1.21, 1.22 are arranged as circuit traces. Receiver lines 1.11, 1.12; 1.21, 1.22 or the circuit traces particularly extend in different planes with through-platings so that undesired short-circuits at junction points are avoided. In the illustrated exemplary embodiment, at least four layers are provided in the circuit board structure.

Figure 4:
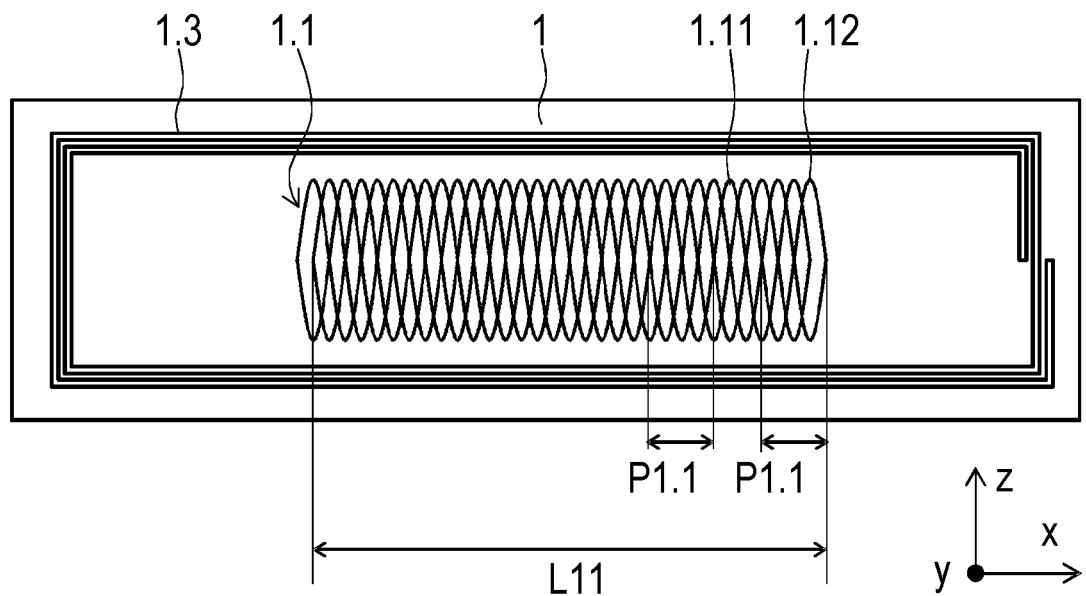
FIG. 4 is a plan view of a first receiver track and an exciter lead of the scanning element.

Receiver lines 1.11, 1.12 of first receiver track 1.1 according to FIG. 4 have an extension L11 in each case (in the illustrated exemplary embodiment, L11=19.2 mm) along direction X and are disposed according to a periodic pattern, which is a sinusoidal pattern in the illustrated exemplary embodiment. In this instance, first receiver lines 1.11, 1.12 have eight windings in each case so that they have a first period P1.1 of 2.4 mm in each case. Thus, first period P1.1 roughly corresponds to graduation period P2.1, so that the following applies:

(first period P1.1):(graduation period P2.1)=2.4 mm:2.36 mm=1.017

With the aid of first receiver lines 1.11, 1.12, it is possible to generate a relatively highly resolving incremental signal during a relative rotation of graduation element 2 in relation to scanning circuit board 1.

In contrast, second receiver lines 1.21, 1.22 of second receiver track 1.2 have only one winding in each case (see FIG. 5) and an extension L12 (in the illustrated exemplary embodiment, L12=11 mm) along direction X so that they each have a period P1.2 of also 11 mm.

In addition, an electronic circuit and also a plug element are provided on scanning element 1. Scanning element 1 is mounted in a housing 11 (see FIG. 1). Via a cable 10, scanning element 1 is able to be connected to subsequent electronics.

Figure 5:
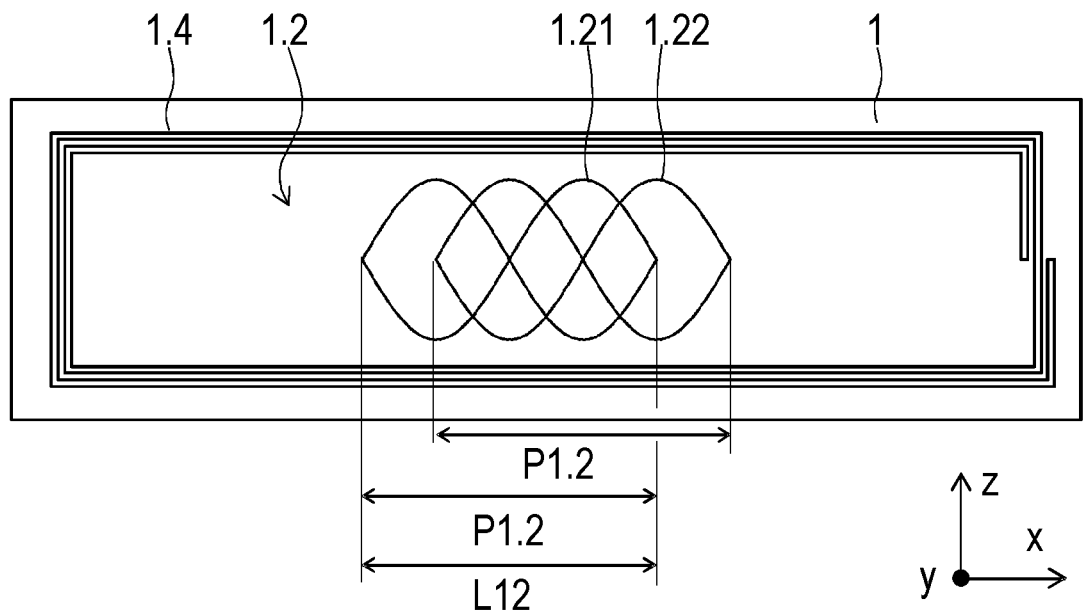
FIG. 5 is a plan view of a second receiver track and an exciter lead of the scanning element.

As may be gathered from FIGS. 3 to 5, a separate exciter lead 1.3, 1.4 is disposed both around the first and around second receiver track 1.1, 1.2. As an alternative, it is possible to use only a single exciter lead.

Figure 7:
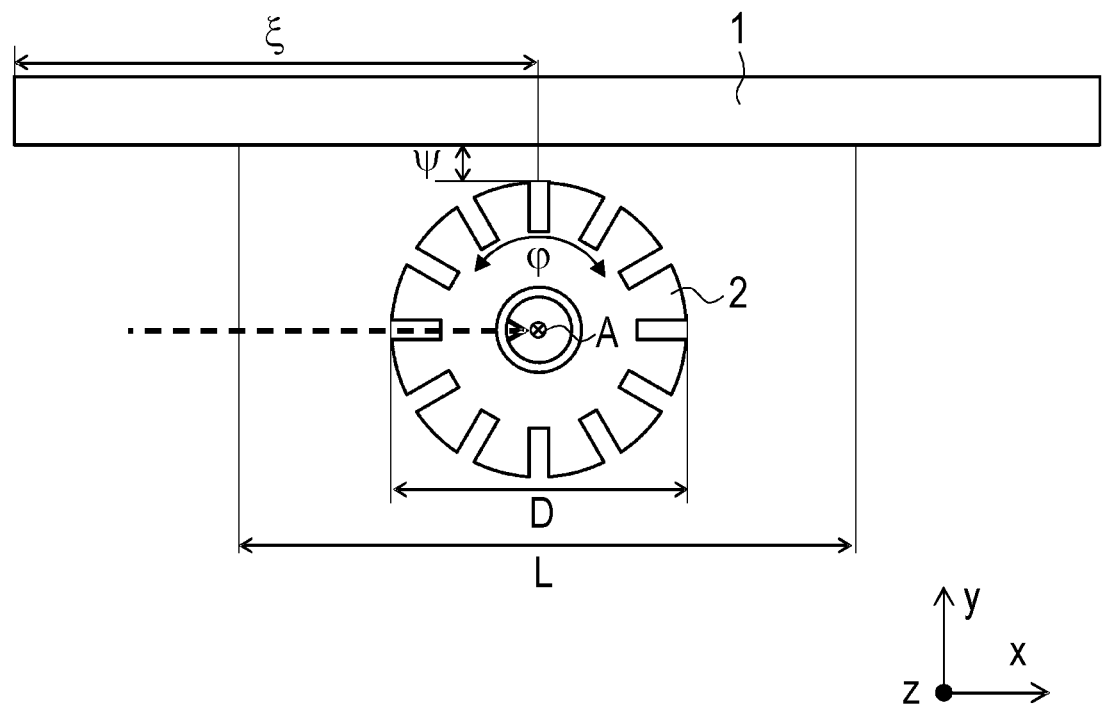
FIG. 7 is a plan view of the graduation element and the scanning element.

Graduation element 2 is often attached to a machine component, which requires the machine component including graduation element 2 to be placed in front of scanning element 1, for instance with the aid of a servo drive, so that the position-measuring device is able to be brought into an operational configuration. For example, graduation element 2, as illustrated in FIG. 7 by the dashed arrow, may be brought into the corresponding working position linearly in the X-direction. As an alternative to the linear movement, a pivoting or rotatory movement is possible as well, so that axis A moves along a curved path. Graduation element 2 lies with a radial air gap, or at distance ψ (see FIG. 7) across from scanning element 1, without scanning element 1 and graduation element 2 touching each other. Graduation element 2 usually serves as the rotor and is mounted on a machine component that is rotatable about axis A. In contrast, scanning element 1 forms the stator of the position-measuring device so that it is fixed in place on a stationary machine component. During a relative rotation of graduation element 2 with respect to scanning element 1 about axis A, a signal is able to be generated in receiver lines 1.11, 1.12 of first receiver track 1.1 through induction effects as a function of the respective angular position φ, thereby making it possible to detect the angular position φ of graduation element 2 relative to scanning element 1.

A prerequisite for generating corresponding signals is that exciter leads 1.3, 1.4 generate a temporally varying electromagnetic excitation field in the region of receiver tracks 1.1, 1.2 or in the region of graduation track 2.1 scanned thereby. In the illustrated exemplary embodiment, exciter leads 1.3, 1.4 are arranged as a plurality of parallel, individual circuit traces through which a current flows. When exciter leads 1.3, 1.4 are energized, an electromagnetic field having an orientation in the shape of a tube or cylinder forms around the respective exciter lead 1.3, 1.4. The field lines of the resulting electromagnetic field extend about exciter leads 1.3, 1.4 in the form of concentric circles, the direction of the field lines depending on the current direction in exciter leads 1.3, 1.4, e.g., in a conventional manner. Eddy currents are induced in the region of webs 2.11, so that a modulation of the field as a function of angular position φ is achieved. Relative angular position φ may be measured accordingly with the aid of receiver track 1.1. The pairs of receiver lines 1.11, 1.12 of first receiver track 1.1 are disposed such that they supply signals that are phase-shifted by 90° in each case so that a determination of the direction of rotation is able to be carried out as well. Receiver track 1.1 for determining angular position φ is surrounded by a discrete exciter lead 1.3. However, angular position φ ascertained in this manner generally has significant errors that are corrected or eliminated by the measurement with the aid of second receiver track 1.2.

Relative position ξ in direction X between graduation element 2 and scanning element 1 is detected with the aid of second receiver track 1.2. The signals generated by receiver lines 1.21, 1.22 are a function of position of graduation element 1.2 relative to scanning element 1.1 in direction X.

The excitation field required to obtain the signals for X-position ξ with the aid of second receiver track 1.2 is generated by exciter leads 1.3, 1.4. Because receiver lines 1.21, 1.22 of second receiver track 1.2 have a second period P1.2 that is greater than first period P1.1, angular position φ of graduation element 2.1 has practically no effect on the signal generated by receiver lines 1.21, 1.22. In the illustrated exemplary embodiment, second period P1.2 is approximately 4.6 times greater or longer than first period P1.1.

As a result, the position-measuring device is able to detect a relative lateral position ξ of graduation element 2 in direction X, which has an orthogonal orientation with respect to axis A, while using precisely the exciter leads 1.3, 1.4 that generate an electromagnetic field, with whose aid angular position φ is ultimately detectable as well.

The electronic circuit of scanning element 1, such as an ASIC component, not only operates as an evaluation element but also as an exciter-control element under whose control the excitation current that flows through exciter leads 1.3, 1.4 is generated. As a result, both exciter leads 1.3, 1.4 are energized by one and the same exciter-control element. It is therefore possible to dispense with special exciter leads for the detection of relative position ξ in the X-direction.

The information pertaining to the precise relative position ξ of graduation element 2 in the X-direction obtained in this manner is used in the evaluation element to correct the value for angular position φ so that this value is able to be generated with a greater measuring precision in comparison with conventional angle encoders.

Figure 6:
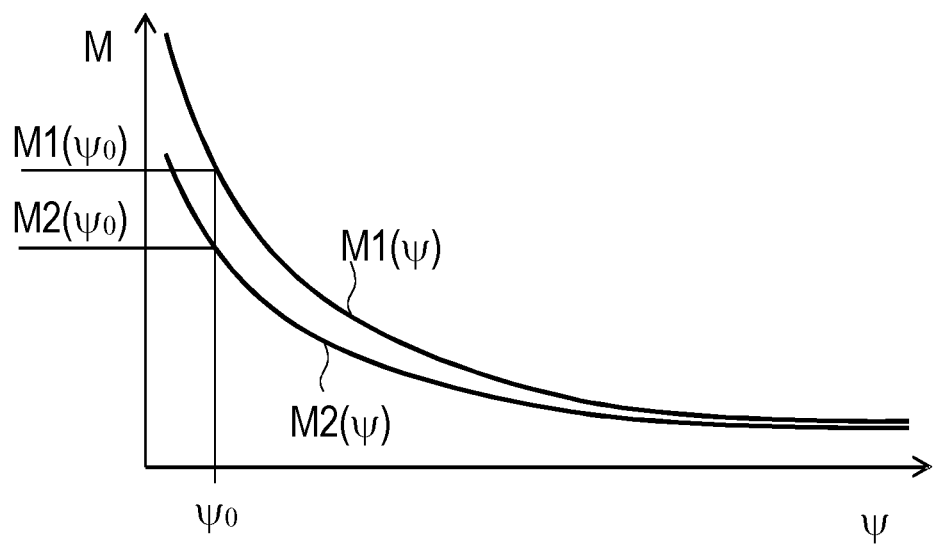
FIG. 6 illustrates the determination of the distance between the scanning element and the gradation element.

In addition, using the position-measuring device described in the illustrated exemplary embodiment, it is also possible to determine relative position ψ of graduation element 2 in relation to scanning element 1 in the Y direction, i.e., the size of the air gap. To do so, the amplitude amounts M1, M2 are generated, such as from the root of the sum of the squared signal amplitudes $S1_0$, $S1_{90}$ ($M1=\sqrt{(S1_0^2+S1_{90}^2)}$). The signal amplitudes are obtained by rectifying the high-frequency, amplitude-modulated input signals in a phase-controlled manner. FIG. 6 illustrates distance ψ of graduation element 2 in second direction Y plotted on the abscissa, and amplitude M plotted on the ordinate. The two curves represent characteristics of amplitude amounts M1(ψ), M2(ψ), which are obtained from first receiver track 1.1 and second receiver track 1.2. It may be gathered from FIG. 6 that the distance between the two curves becomes smaller with increasing distance ψ. As a result, an unambiguous determination of distance ψ in second direction Y is able to be carried out based on first amplitude amount M1 and second amplitude amount M2. For example, it is possible to form the quotient Q(ψ)=M1(ψ)/M2(ψ), from whose magnitude the distance ψ in the second direction Y is able to be determined in an unambiguous manner.

In the illustrated exemplary embodiment, exciter leads 1.3, 1.4 are fed via a single excitation-control element, meaning that the same excitation current flows in exciter leads 1.3, 1.4. With the aid of the afore-described method for determining distance ψ of graduation element 2 in second direction Y, it is largely possible to eliminate errors that are caused by fluctuations in the excitation current, so that these fluctuations have virtually no effect on the determination of distance ψ.

What is claimed is:

1. An inductive position-measuring device, comprising:
a scanning element; and
a graduation element rotatable about an axis relative to the scanning element;
wherein the scanning element includes: at least one exciter lead; a first receiver track including at least one receiver line that extends according to a first periodic pattern having a first period along a first direction; and a second receiver track including at least one receiver line;
wherein the graduation element includes a graduation track that extends in a circumferential direction in relation to the axis and has a graduation period along the circumferential direction; and
wherein the at least one exciter lead is adapted to generate an electromagnetic field, the graduation track is adapted to modulate the electromagnetic field, and the position-measuring device is adapted to detect an angular position of the graduation element relative to the scanning element with the aid of the receiver line of the first receiver track based on the modulated electromagnetic field and to detect a lateral position of the graduation element in the first direction relative to the scanning element with the aid of the receiver line of the second receiver track based on the modulated electromagnetic field.

2. The inductive position-measuring device according to claim 1, wherein the first receiver track and/or the second receiver track includes at least two receiver lines.

3. The inductive position-measuring device according to claim 1, wherein the following relationship is satisfied:

1.5>[first period:graduation period]>0.75.

4. The inductive position-measuring device according to claim 1, wherein the first receiver track includes at least one receiver line that extends along the first direction across a length that is at least three times greater than the first period.

5. The inductive position-measuring device according to claim 1, wherein the receiver line of the second receiver track is arranged according to a second periodic pattern having a second period that is greater than the first period.

6. The inductive position-measuring device according to claim 1, wherein the first receiver track is arranged at a radial offset relative to the second receiver track in relation to the axis.

7. The inductive position-measuring device according to claim 1, wherein the first receiver track and/or the second receiver track is arranged on a flat plane.

8. The inductive position-measuring device according to claim 1, wherein the graduation track includes alternating webs and gaps.

9. The inductive position-measuring device according to claim 1, wherein the graduation element has a circular outer contour having a diameter, the second receiver track includes has at least one receiver line that extends along the first direction across a length, and the length is greater than one-half of the diameter.

10. The inductive position-measuring device according to claim 1, wherein the graduation element has a circular outer contour having a diameter, the first receiver track includes at least one receiver line that extends along the first direction across a length, and the length is greater than the diameter.

11. The inductive position-measuring device according to claim 1, wherein the graduation element has a circular outer contour having a diameter, the receiver line of the second receiver track is arranged according to a second periodic pattern having a second period, and the second period is greater than the diameter.

12. The inductive position-measuring device according to claim 1, wherein a first signal having a first amplitude amount generatable with the aid of the receiver line of the first receiver track, a second signal having a second amplitude amount is generatable with the aid of the receiver line of the second receiver track, and the position-measuring device is adapted to determine a distance in a second direction between the scanning element and the graduation element based of the first amplitude amount and the second amplitude amount.

13. The inductive position-measuring device according to claim 1, wherein the first direction corresponds to a lateral direction.

14. The inductive position-measuring device according to claim 1, wherein the graduation element is movable relative to the scanning element in a lateral direction perpendicular to the axis.

15. The inductive position-measuring device according to claim 1, wherein the receiver line of the second receiver track is arranged according to a second periodic pattern having a second period that greater than the graduation period of the graduation track.

16. The inductive position-measuring device according to claim 15, wherein the first receiver track is arranged at a smaller radial distance from the axis than the second receiver track.

17. The inductive position-measuring device according to claim 1, wherein the graduation element has a curved lateral surface on which the graduation track is disposed.

18. The inductive position-measuring device according to claim 17, wherein the first receiver track and/or the second receiver track is arranged on a curved plane, a radius of curvature of the curved plane differing from a radius of curvature of the curved lateral surface.

19. The inductive position-measuring device according to claim 1, wherein the receiver line of the second receiver track extends according to a second periodic pattern having a second period along the first direction.

20. The inductive position-measuring device according to claim 19, wherein the first direction corresponds to a lateral direction perpendicular to the axis.

* * * * *